(12) United States Patent
Dobbs

(10) Patent No.: US 9,739,497 B2
(45) Date of Patent: Aug. 22, 2017

(54) HUMIDITY CONTROL FOR AIR CONDITIONING SYSTEM

(71) Applicant: Carrier Corporation, Farmington, CT (US)

(72) Inventor: Gregory M. Dobbs, Philadelphia, PA (US)

(73) Assignee: CARRIER CORPORATION, Farmington, CT (US)

( * ) Notice: Subject to any disclaimer, the term of this patent is extended or adjusted under 35 U.S.C. 154(b) by 587 days.

(21) Appl. No.: 14/349,668

(22) PCT Filed: Oct. 2, 2012

(86) PCT No.: PCT/US2012/058437
§ 371 (c)(1),
(2) Date: Apr. 4, 2014

(87) PCT Pub. No.: WO2013/052468
PCT Pub. Date: Apr. 11, 2013

(65) Prior Publication Data
US 2014/0238055 A1 Aug. 28, 2014

Related U.S. Application Data

(60) Provisional application No. 61/543,847, filed on Oct. 6, 2011.

(51) Int. Cl.
*F25D 17/04* (2006.01)
*F24F 11/00* (2006.01)
(Continued)

(52) U.S. Cl.
CPC .......... *F24F 11/001* (2013.01); *F24F 3/1405* (2013.01); *F24F 5/0021* (2013.01);
(Continued)

(58) Field of Classification Search
CPC ... F24F 5/0021; F24F 11/0076; Y02E 60/147; F28D 20/021
See application file for complete search history.

(56) References Cited

U.S. PATENT DOCUMENTS 2,208,443 A   4/1938  Ashley
2,144,693 A * 1/1939  Seid .................... F24F 3/14
                                              165/249

(Continued)

OTHER PUBLICATIONS

PCT International Preliminary Report on Patentability and Written Opinion of the International Searching Authority for International Application No. PCT/US2012/058437, Apr. 17, 2014, 10 pages.

(Continued)

*Primary Examiner* — Elizabeth Martin
(74) *Attorney, Agent, or Firm* — Cantor Colburn LLP

(57) ABSTRACT

An air conditioning system includes a cooling unit having a cooling coil and a fan, the cooling unit for cooling recirculated air from a return duct; a bypass duct providing an air pathway bypassing the cooling unit; a phase change material (PCM) module including a PCM and a PCM fan for drawing makeup air over the PCM; and a supply duct fluidly coupled to the cooling unit and the PCM module, the supply duct for supplying conditioned air to a space to be conditioned.

7 Claims, 4 Drawing Sheets

(51) Int. Cl.
  *F24F 3/14*   (2006.01)
  *F24F 5/00*   (2006.01)
  *F25B 49/02*  (2006.01)

(52) U.S. Cl.
  CPC ........ *F24F 11/0076* (2013.01); *F25B 49/022* (2013.01); *Y02E 60/147* (2013.01)

(56) References Cited

U.S. PATENT DOCUMENTS

| | | |
|---|---|---|
| 3,217,790 A | 11/1965 | Wasson et al. |
| 3,989,097 A | 11/1976 | Schildknecht |
| 5,822,996 A | 10/1998 | Sienel et al. |
| 6,089,464 A | 7/2000 | Morgan |
| 6,386,281 B1 | 5/2002 | Ganesh et al. |
| 6,427,454 B1 | 8/2002 | West |
| 6,508,303 B1 | 1/2003 | Naderer |
| 6,701,723 B1 | 3/2004 | Dobmeier et al. |
| 7,891,573 B2 | 2/2011 | Finkam et al. |
| 2003/0183375 A1* | 10/2003 | Clarksean ............. F24F 5/0017 165/132 |
| 2009/0211732 A1* | 8/2009 | Goenka ............... B60H 1/00328 165/104.17 |

OTHER PUBLICATIONS

Transmittal of the International Search Report and the Written Opinion of the International Searching Authority, or the Declaration, for International Application No. PCT/US2012/058437, Dec. 12, 2012, 15 pages.

\* cited by examiner

HUMIDITY CONTROL FOR AIR CONDITIONING SYSTEM

BACKGROUND OF THE INVENTION

Embodiments relate generally to heating, ventilation and air conditioning systems, and in particular to humidity control for air conditioning systems.

Packaged, unitary rooftop equipment suffers from energy, humidity, and comfort issues due to the cycling behavior of a compressor and the need to provide outside, or makeup, air continuously. When running at part load, the compressor cycles on and off in response to the thermostat set point and an associated dead band. At the beginning of each cooling cycle, there are several minutes while the evaporator coil is being re-cooled to the supply air delivery temperature and it remains warmer than the dew point of the evaporator entering air and consequently humidity is not removed from the air and condensate does not appear. This leads to some sensible cooling, but no latent cooling (e.g., moisture removal). At the end of each cooling cycle, it takes several minutes for the condensed water film on the evaporator coil to drain down. During this time, the airflow for ventilation re-evaporates the water just condensed on the evaporator coil back into the airstream, rehumidifying the supply air and wasting energy. The combination of these effects leads to less dehumidification of the conditioned area than otherwise would be possible.

BRIEF DESCRIPTION OF THE INVENTION

According to one aspect of the invention, an air conditioning system includes a cooling unit having a cooling coil and a fan, the cooling unit for cooling recirculated air from a return duct; a bypass duct providing an air pathway bypassing the cooling unit; a phase change material (PCM) module including a PCM and a PCM fan for drawing makeup air over the PCM; and a supply duct fluidly coupled to the cooling unit and the PCM module, the supply duct for supplying conditioned air to a space to be conditioned.

According to another aspect of the invention a method of controlling an air conditioning system includes turning a compressor on to cool a cooling coil; moving a first damper to a first position blocking an inlet of a bypass duct providing an air pathway bypassing the cooling unit, the first damper directing makeup air to the cooling unit; moving a second damper to a first position blocking an outlet of the bypass duct; turning the compressor off; moving the first damper to a second position opening the inlet of the bypass duct and blocking makeup air from the cooling unit; and moving the second damper to a second position opening the outlet of the bypass duct.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
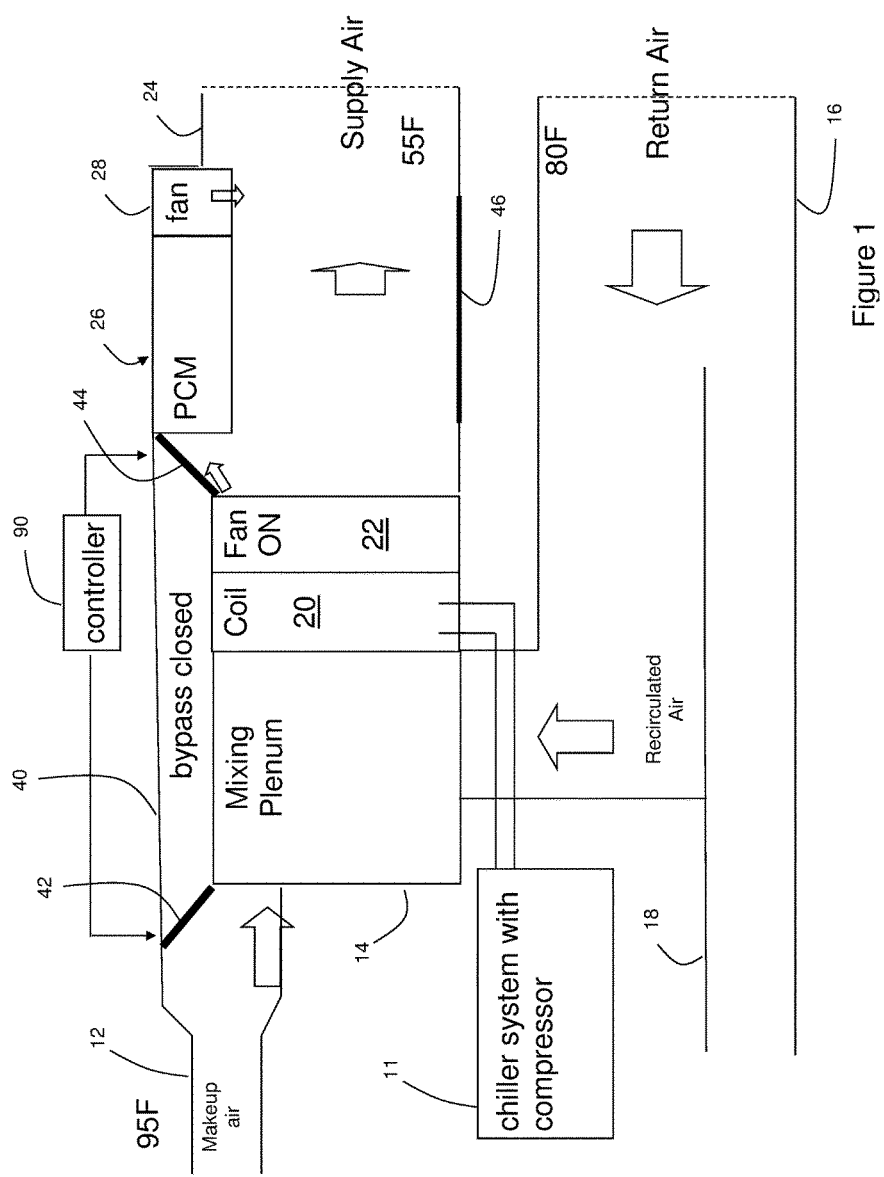
FIG. 1 depicts an air conditioning system in an exemplary embodiment operating in a first mode.

FIG. 1 depicts an air conditioning system in an exemplary embodiment operating in a first mode. The air conditioning system in FIG. 1 is operating in a cooling mode with a compressor 11 running, along with condenser fan and the rest of the balance of the plant. Inlet duct 12 is the ingress point for makeup air to be conditioned and supplied to a space to be conditioned via supply duct 24. In the example in FIG. 1, the makeup air is 95° F./35° C. The makeup air is at the outside air temperature, which varies according to the weather. Makeup air in the inlet duct 12 may be air from an energy recovery ventilator (ERV). The makeup air is provided to mixing plenum 14 to be mixed with recirculated air (a portion of the return air) in return duct 16. In the example in FIG. 1, the return air in return duct 16 is 80° F./26.6° C. This nominal temperature is the room air at the height of the return register, nominally the set point temperature+thermostat deadband+any vertical thermal gradient in the room. Some of the return air is exhausted (outside the building or through the ERV) via exhaust duct 18.

The outlet stream of mixing plenum 14 is provided to a cooling unit including a cooling coil 20 and a fan 22. Coiling coil 20 is part of a chiller system 11 having a compressor. Fan 22 is on when the compressor is on and draws air over the coil 20 and towards supply duct 24. In alternate embodiments, fan 22 is a variable speed fan that varies the airflow to get different amounts of cooling. The compressor would then cycle ON and OFF as needed to keep the supply air at a required temperature. Alternatively, the compressor may be a variable speed compressor. In the example in FIG. 1, a typical supply air temperature in supply duct 24 is 55 F.°/12.8° C. In alternate embodiments, coil 20 uses chilled water rather than refrigerant, in which case the supply air temperature may be different.

A phase change material (PCM) module 26 receives a portion of the cooled makeup air by virtue of PCM fan 28 drawing air through the PCM module 26. The PCM module 26 includes a PCM that freezes in the presence of the cooled supply air when the compressor is running. In a second mode of operation when the compressor is off, makeup air is diverted through PCM module 26 and cooled as described herein with reference to FIG. 2. The PCM fan 28 can shut off after the PCM freezes. The shutoff of PCM fan 28 may be based on time (e.g., the compressor has been on for a predetermined amount of time) or temperature (e.g., the PCM has reached a predetermined temperature).

Figure 2:
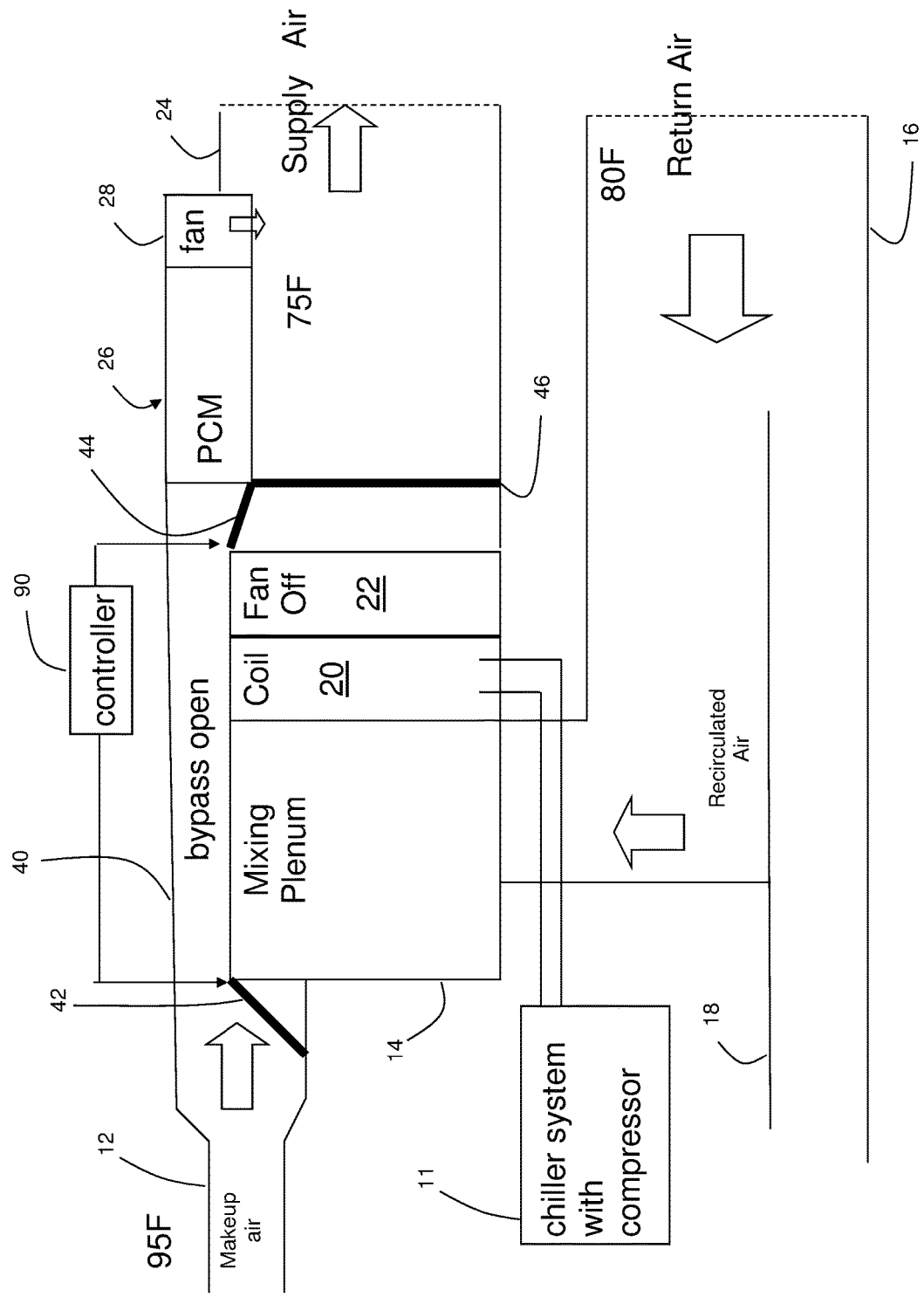
FIG. 2 depicts the air conditioning system of FIG. 1 operating in a second mode.

Also evident in FIG. 1 is a bypass duct 40. A first damper 42 can be positioned to close (as shown in FIG. 1) or open (as shown in FIG. 2) an inlet to bypass duct 40. When the compressor is running and fan 22 on, first damper 42 is positioned to close the inlet to the bypass duct 40. Similarly, second damper 44/46 is positioned to close the outlet of the bypass duct 40. As described in further detail with respect to FIG. 2, dampers 42 and 44/46 are repositioned when the compressor is off. Dampers 42 and 44/46 may be positioned by actuators acting in response to control signals from a controller 90. Controller 90 may be implemented using a general-purpose microprocessor based controller programmed to carry the operations described herein. Alternatively, dampers 42 and 44/46 may be weighted and balanced such that when fan 22 is on, dampers 42 and 44/46 are in a first position (FIG. 1) and when fan 22 is off, dampers 42 and 44/46 are in a second position (FIG. 2).

FIG. 2 depicts the air conditioning system of FIG. 1 operating in a second mode. In FIG. 2, the compressor is off and fan 22 is off. First damper 42 has been repositioned to open the inlet of bypass duct 40 so that makeup air in inlet duct 12 flows into bypass duct 40. Damper 42 also blocks the makeup air from entering mixing plenum 14 and eventually reaching coil 20. Similarly, damper 44/46 is repositioned to open the outlet of bypass duct 40 and to prevent makeup air exiting the bypass duct 40 from reaching cooling coil 20. As such, dampers 42 and 44/46 allow airflow through the bypass duct 40 and isolate coil 20 when the compressor and fan 22 are off. Makeup air passing through bypass duct 40 is drawn through the PCM module 26 by PCM fan 28 and provided to supply duct 24. The PCM module 26 cools the makeup air prior to being routed to supply duct 24. In the example in FIG. 2, the supply air in supply duct 24 is 75° F./23.9° C. The PCM becomes "discharged" by providing cooling through a combination of its heat capacity and the enthalpy of its phase change at the transition temperature. In FIG. 1 the PCM is being "recharged" by being cooled below the transition temperature by the supply air. The choice of transition temperature and other physical properties and the size of PCM module will govern how long of a cooling cycle the PCM module can handle.

It is noted that the system of FIGS. 1 and 2 is part of a ventilation system in which is air is constantly being circulated. The system of FIGS. 1 and 2 provides a separate bypass duct 40 for the continuously flowing makeup air when the compressor is off. The bypass duct 40 and dampers 42 and 44/46 keep the coil 20 isolated when the compressor is off to keep coil 20 as cold as possible. Isolating the coil 20 from the mixed air (makeup air and recirculated air) prevents coil 20 from being reheated above the dew point of the flowing mixed air when the compressor is OFF. The PCM module 26 provides thermal energy storage using phase change materials. The phase change materials are refrozen when the compressor is on and cool and limit the temperature of the makeup air when the compressor is off.

Figure 3:
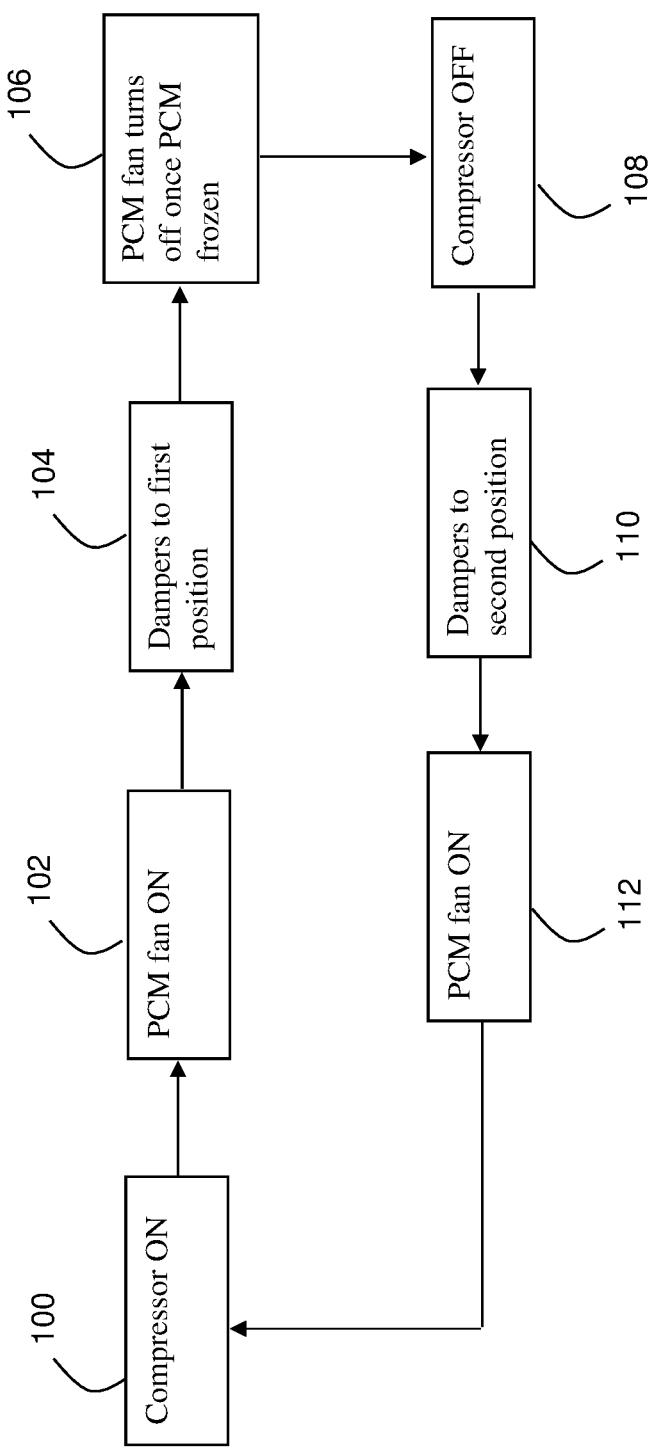
FIG. 3 depicts a method of operating the air conditioning system of FIG. 1.

FIG. 3 depicts a method of operating the air conditioning system of FIG. 1. A typical operating cycle would include the compressor being turned on at block 100, for example, in response to a thermostat. At block 102, the PCM fan 28 is turned on. At block 104, dampers 42 and 44/46 are positioned to block the bypass duct as shown in FIG. 1. Makeup air in inlet duct 12 is cooled by coil 20 and the PCM in PCM module 26 is frozen. Once the PCM is cooled satisfactorily (e.g., reaches a predetermined temperature), PCM fan 28 can be shut off at block 106 so as to not incur a pressure drop in supply duct 24. The PCM has a heat capacity as well as an enthalpy of phase transition. Depending on the transition temperature chosen in relation to the supply air (coil exit) temperature, one may want to cool the PCM until it gets to the coil exit temperature and then turn off PCM fan 28.

Once the desired temperature is reached, the compressor shuts off at block 108 and dampers 42 and 44/46 are moved to the second position at block 110 as shown in FIG. 2. As noted above, the dampers 42 and 44/46 isolate coil 20 to keep it cold. PCM fan 28 is turned on at block 112. Makeup air is routed through bypass duct 40 and cooled and held to a maximum delivery temperature by the PCM module 26. The capacity of PCM module 26 should be large enough so that not all the PCM is melted by the end of compressor OFF cycle under most circumstances.

Using the system of FIGS. 1 and 2, the supply air is never injected at an uncomfortable temperature or a higher than desirable humidity from the influence of the makeup air. The main coil 20 stays cold enough to stay below the dewpoint of the makeup air while compressor is OFF, eliminating cooldown transient and improving humidity removal. Also, makeup air does not flow through main coil 20 while the compressor is OFF, so loss of enthalpy by reevaporation does not occur.

Figure 4:
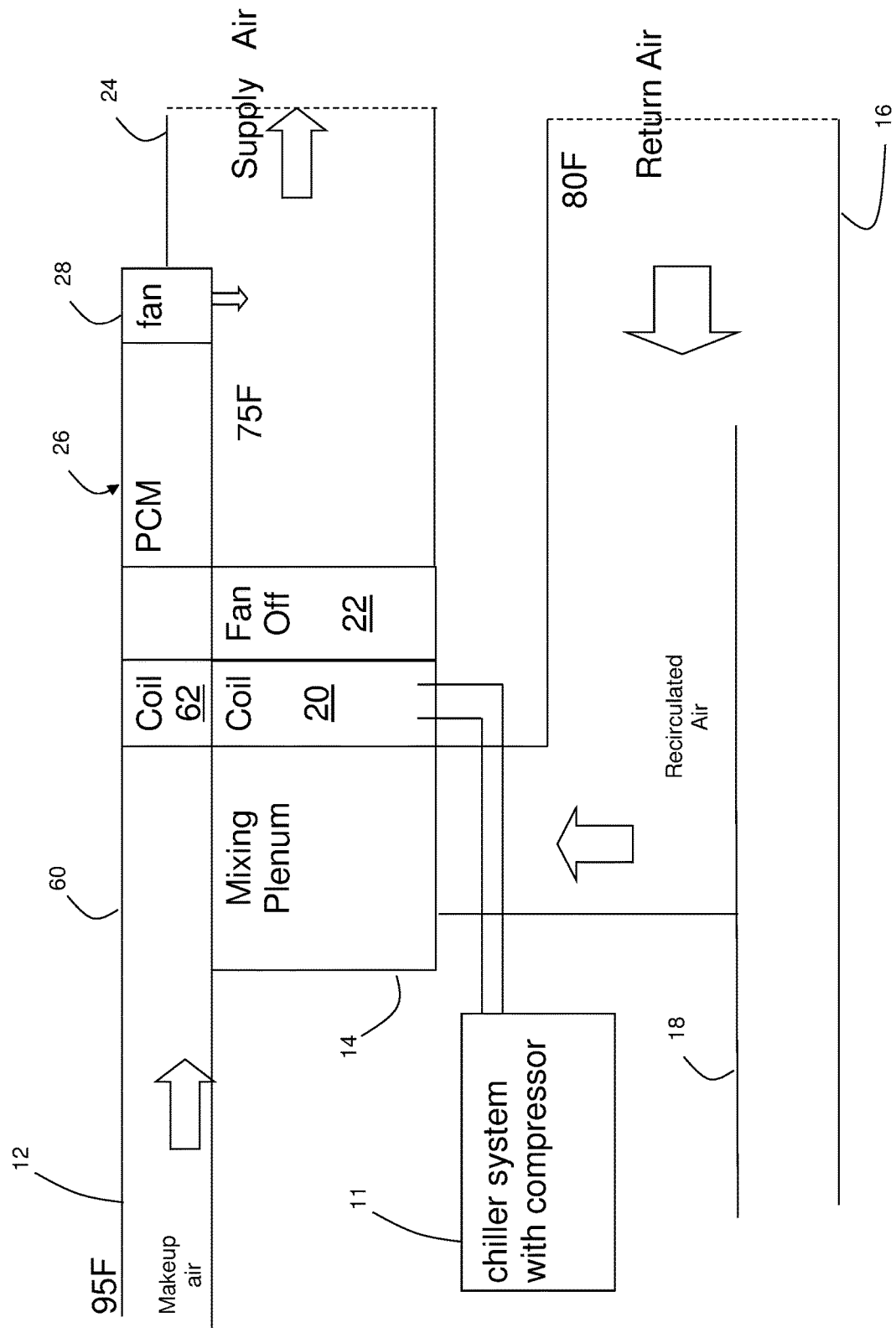
FIG. 4 depicts an air conditioning system in an alternate exemplary embodiment.

FIG. 4 depicts an air conditioning system in an alternate exemplary embodiment. The system of FIG. 4 is similar to that in FIG. 2, and the same reference numerals are used for similar elements. FIG. 4 includes a permanent bypass duct 60 and a bypass cooling coil 62 positioned in bypass duct 60. When the compressor is on, coil 20 cools the recirculated air in return duct 20 and fan 22 is on, drawing air over coil 20. Additionally, coil 62 cools the makeup air in bypass duct 60. Bypass duct 60 directs the cooled makeup air to the PCM module 26. When the compressor is on, coil 62 cools the makeup air sufficiently to freeze the PCM in PCM module 26.

When compressor is off, coils 20 and 62 are off and fan 22 is off, which is the state shown in FIG. 4. Makeup air in bypass duct 60 is drawn through PCM module 26 by PCM fan 28. The PCM module 26 cools the makeup air as discussed above. The capacity of PCM module 26 should be large enough so that not all the PCM is melted by the end of compressor OFF cycle under most circumstances.

As noted above with reference to FIG. 2, the system of FIG. 4 prevents makeup air from warming coil 20 when the compressor and fan 22 are off. This isolates coil 20 so that upon restarting of the compressor, coil 20 is already cold thereby improving efficiency and dehumidification.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning system comprising:
   a cooling unit having a cooling coil and a fan, the cooling unit for cooling recirculated air from a return duct;
   a bypass duct providing an air pathway bypassing the cooling unit;
   a phase change material (PCM) module including a PCM and a PCM fan for drawing makeup air over the PCM;
   a supply duct fluidly coupled to the cooling unit and the PCM module, the supply duct for supplying conditioned air to a space to be conditioned; and
   a first damper positionable in a first position blocking an inlet of the bypass duct and directing makeup air to the cooling unit, the first damper positionable in a second position opening the inlet of the bypass duct and blocking makeup air from the cooling unit.

2. The air conditioning system of claim 1 further comprising:
   a second damper positionable in a first position blocking an outlet of the bypass duct and allowing cooled makeup air from the cooling unit to reach the PCM module.

3. The air conditioning system of claim 1 further comprising:
   a mixing plenum combining the makeup air and the recirculated air, the mixing plenum providing an output to the cooling unit.

4. The air conditioning of claim 1 further comprising: a bypass cooling coil in the bypass duct.

5. An air conditioning system comprising:
   a cooling unit having a cooling coil and a fan, the cooling unit for cooling recirculated air from a return duct;
   a bypass duct providing an air pathway bypassing the cooling unit;
   a phase change material (PCM) module including a PCM and a PCM fan for drawing makeup air over the PCM;
   a supply duct fluidly coupled to the cooling unit and the PCM module, the supply duct for supplying conditioned air to a space to be conditioned;
   a first damper positionable in a first position blocking an inlet of the bypass duct and directing makeup air to the cooling unit, the first damper is positionable in a second position opening the inlet of the bypass duct and blocking makeup air from the cooling unit; and
   a second damper positionable in a first position blocking an outlet of the bypass duct and allowing cooled makeup air from the cooling unit to reach the PCM module;
   wherein the second damper is positionable in a second position coupling the outlet of the bypass duct to the PCM module.

6. The air conditioning system of 5 wherein:
   the second damper in the second position blocking make up air from flowing through the cooling coil.

7. The air conditioning system of claim 6 wherein:
   the first damper is in the first position when the second damper is in the first position and the first damper is in the second position when the second damper is in the second position.

* * * * *